(12) United States Patent
Allen, Jr.

(10) Patent No.: US 6,297,768 B1
(45) Date of Patent: Oct. 2, 2001

(54) TRIGGERABLE REMOTE CONTROLLER

(75) Inventor: Alvin C. Allen, Jr., Liberty, TX (US)

(73) Assignee: LunarEye, Inc., Liberty, TX (US)

( * ) Notice: Subject to any disclaimer, the term of this patent is extended or adjusted under 35 U.S.C. 154(b) by 0 days.

(21) Appl. No.: 09/257,772

(22) Filed: Feb. 25, 1999

(51) Int. Cl.$^7$ ..................................................... G08B 5/22
(52) U.S. Cl. ................................ 342/357.1; 342/357.06; 342/450; 342/457; 455/404; 455/422; 340/825.36; 340/825.44; 340/825.49
(58) Field of Search ....................... 342/357.01, 357.17, 342/450–465; 340/426, 990, 825.36, 825.44, 825.49

(56) References Cited

U.S. PATENT DOCUMENTS

| | | |
|---|---|---|
| 4,651,157 | 3/1987 | Gray et al. . |
| 4,688,244 | 8/1987 | Hannon et al. . |
| 4,750,197 | 6/1988 | Denekamp et al. . |
| 5,223,844 | 6/1993 | Mansell et al. . |
| 5,334,974 | 8/1994 | Simms et al. . |

(List continued on next page.)

FOREIGN PATENT DOCUMENTS

| | | |
|---|---|---|
| 197 33 579 A1 | 2/1999 | (DE) . |
| 0 242 099 A2 | 10/1987 | (EP) . |
| 0 799 753 A2/A3 | 10/1997 | (EP) . |
| 2 718 532 A1 | 10/1995 | (FR) . |
| 2 279 478 A | 1/1995 | (GB) . |
| 95 13943 | 5/1995 | (WO) . |
| WO 96/26614 | 8/1996 | (WO) ............................. H04Q/1/30 |
| WO 98/00988 | 1/1998 | (WO) ............................. H04Q/7/22 |
| WO 00/44185 | 7/2000 | (WO) ............................. H04Q/7/22 |

OTHER PUBLICATIONS

Cellemetry, http://www.cellemetry.com/html/techoverview.html. "Measurement Alarm Monitoring Remote Control Location/GPS", Technical Overview, Jan. 1999, p. 1.
Cellemetry, http://www.cellemetry.com/html/systemdes.html, "Measurement Alarm Monitoring Remote Control Location/GPS", System Description, Oct. 1998, pp. 1–3.
Cellemetry, http://www.celemetry.com/html/glossory.html, "Measurement Alarm Monitoring Remote Control Location/GPS", Glossary, 1998, pp. 1–2.

(List continued on next page.)

Primary Examiner—Bernarr E. Gregory
(74) Attorney, Agent, or Firm—Howard L. Speight; Baker Botts L.L.P.

(57) ABSTRACT

A triggerable remote controller is disclosed which includes a trigger signal including a command, a GPS processor coupled to the trigger signal, a position signal carrying position information generated by the GPS processor in response to the trigger signal, a telemetry transmitter coupled to the position signal, a telemetry transmit signal transmitted by the telemetry transmitter, the telemetry transmit signal carrying the position information, a trigger signal controller coupled to the trigger signal, an actuator coupled to the trigger signal controller, the trigger signal controller being configured to attempt to activate the actuator depending on the command. A sensor may also be coupled to the trigger signal controller and the trigger signal controller may be configured to attempt to access the sensor. A GPS antenna embedded in a grommet-shaped housing is also disclosed.

19 Claims, 13 Drawing Sheets

U.S. PATENT DOCUMENTS

| | | |
|---|---|---|
| 5,396,540 | 3/1995 | Gooch . |
| 5,418,537 | 5/1995 | Bird . |
| 5,422,813 | 6/1995 | Schuchman et al. . |
| 5,479,482 | 12/1995 | Grimes . |
| 5,490,200 | 2/1996 | Snyder et al. . |
| 5,497,149 | 3/1996 | Fast . |
| 5,515,043 | 5/1996 | Berard et al. . |
| 5,546,444 | 8/1996 | Roach, Jr. et al. . |
| 5,572,204 | 11/1996 | Timm et al. . |
| 5,629,693 | 5/1997 | Janky . |
| 5,640,139 | 6/1997 | Egeberg . |
| 5,652,570 | 7/1997 | Lepkofker . |
| 5,673,305 | 9/1997 | Ross . |
| 5,682,133 | 10/1997 | Johnson et al. . |
| 5,686,910 | 11/1997 | Timm et al. . |
| 5,736,962 | 4/1998 | Tendler . |
| 5,742,233 | 4/1998 | Hoffman et al. . |
| 5,742,509 | 4/1998 | Goldberg et al. . |
| 5,760,742 | 6/1998 | Branch et al. . |
| 5,777,580 | 7/1998 | Janky et al. . |
| 5,786,789 | 7/1998 | Janky . |
| 5,797,134 | 8/1998 | McMillan et al. . |
| 5,808,564 | 9/1998 | Simms et al. . |
| 5,811,886 | 9/1998 | Majmudar . |
| 5,825,327 | 10/1998 | Krasner . |
| 5,838,237 | 11/1998 | Revell et al. . |
| 5,845,203 | 12/1998 | LaDue . |
| 5,873,043 | 2/1999 | Comer . |
| 5,898,391 | 4/1999 | Jefferies et al. . |
| 5,914,675 | 6/1999 | Tognazzini . |
| 5,917,405 * | 6/1999 | Joao ..................................... 340/426 |
| 5,918,172 | 6/1999 | Saunders et al. . |
| 5,926,086 | 7/1999 | Escareno et al. . |
| 5,929,752 | 7/1999 | Janky et al. . |
| 5,930,713 | 7/1999 | Nguyen . |
| 5,933,100 | 8/1999 | Golding . |
| 5,939,975 * | 8/1999 | Tsuria et al. ......................... 340/426 |
| 5,940,004 | 8/1999 | Fulton . |
| 5,973,618 * | 10/1999 | Ellis ..................................... 340/990 |
| 6,069,570 | 5/2000 | Herring . |

OTHER PUBLICATIONS

Motorola, "GT Plus Oncore, GPS Receiver", Sep. 1,1998.
Motorola, "SL Oncore, GPS Receiver", Apr. 3, 1998.
Motorola, "Oncore, Evaluation Kits", Apr. 3, 1998.
Motorola, RF Oncore, GPS Module, Sep. 1, 1998.
Motorola, "Oncore, GPS ChipSet", Apr. 3, 1998.
Motorola, Semiconductor Technical Data, "GPS Digital Correlator", 1997, pp. 1–10.
Motorola, Semiconductor Technical Data, "Integrated GPS Downconverter", 1997.
Motorola, "New Chip Enables Paging To Industrial Equipment", Aug. 31, 1998, pp. 1–3.
Motorola, "M–CORE Processor Architecture", 1998. p. 1.
SAT–TRAX, http://www.sat–trax.com/news.htm, "Sat–Trax International Locates Stolen Vehicles by Computer Through GPS Satellite and Cellular Link", Aug. 1, 1998. pp. 1–2.
Standard Communications, "CRM4100 Cellular Radio Module for AMPS", Oct. 8, 1997, pp. 1–7.
Hassell, Greg. "Cheap insurance comes at a price," The Houston Chronicle, Section C, Nov. 3, 1999.

* cited by examiner

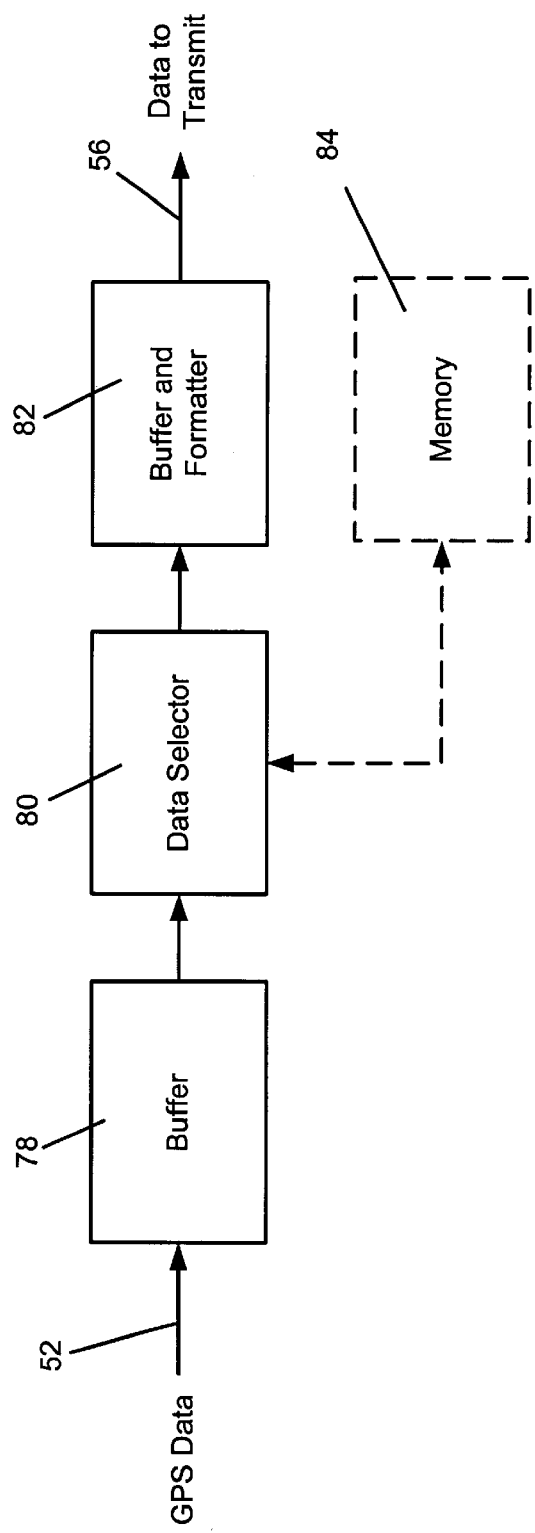

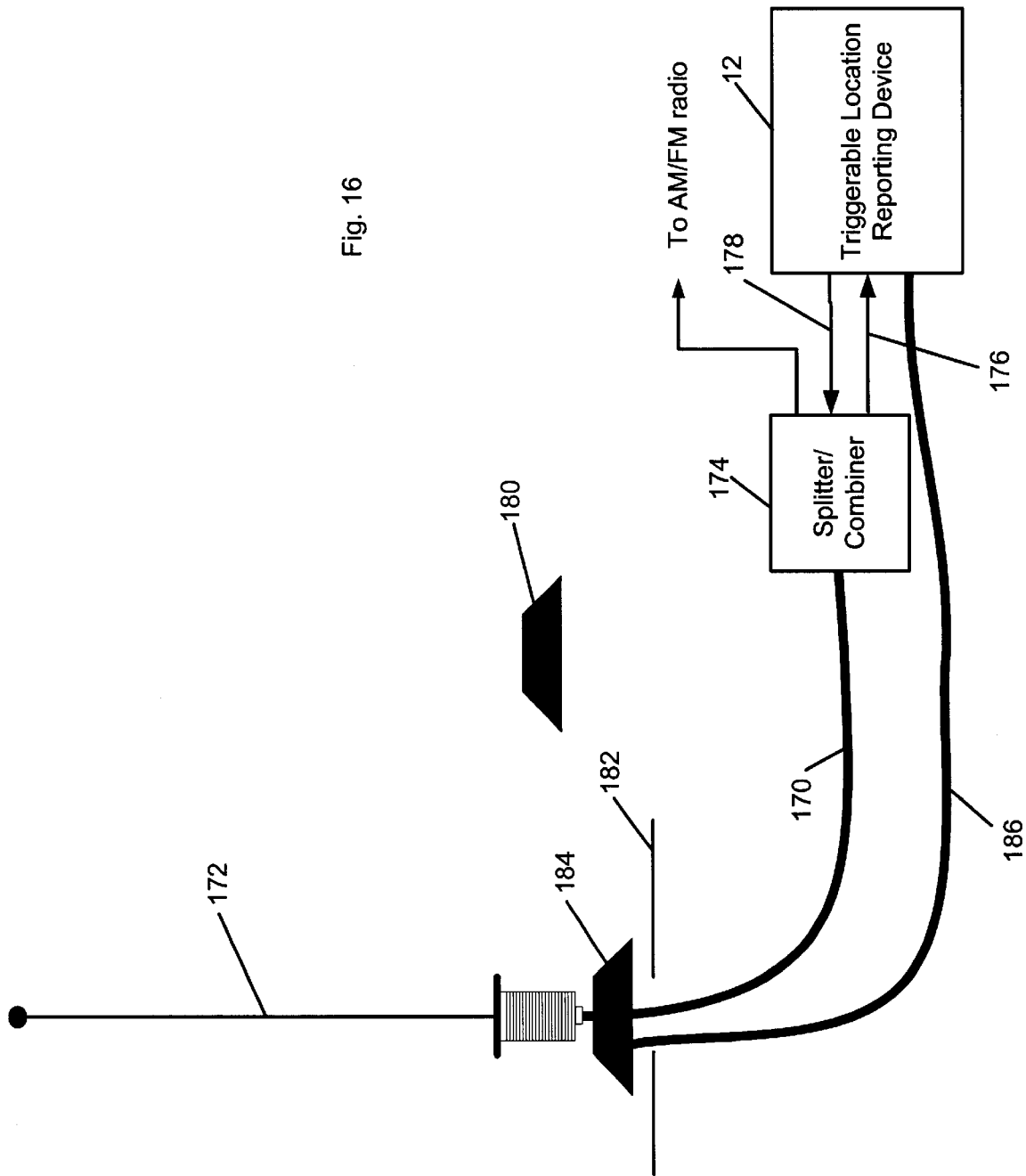

TRIGGERABLE REMOTE CONTROLLER

FIELD OF THE INVENTION

This invention relates generally to location reporting apparatus and methods. More particularly, this invention relates to location reporting apparatus and methods that use the Global Positioning Satellite System ("GPS") to ascertain an object's location. Even more particularly, this invention relates to location reporting apparatus and methods that are triggerable and that report their location derived from GPS signals via cellular, satellite or terrestrial two-way paging signals.

BACKGROUND OF THE INVENTION

Frequently, people use credit to purchase consumer items, such as automobiles, televisions or computers. The purchasers take possession of the item and take it to their homes or offices and put them into use. They are responsible for making periodic payments to the creditor, the person or entity that extended the credit, to pay off the loan. The creditor retains a lien on the property and is also known as a "lien-holder".

In today's mobile society, people frequently move from one location to another. When they move, they typically take their possessions, including those possessions covered by a lien held by the lien-holder. Sometimes when they move they stop making their periodic payments to the lien-holder, perhaps believing that they no longer have to make payments and that the lien-holder will not be able to locate them.

Further, some people simply move a possession, such as an automobile, covered by a lien, in order to hide it from the lien-holder when they stop making payments.

In either case, the lien-holder is faced with having to locate and take possession of the item covered by the lien. At times, such a process can be expensive, time consuming, and even dangerous, requiring the lien-holder to hire investigators to locate the debtor and, hopefully, the item covered by the lien.

Stolen items present a similar challenge. In the case of automobiles, thieves can steal a car, take it to a "chop shop", or a specially outfitted body shop where the automobile is dismantled into salable parts in just a few hours. The traditional response to an automobile theft is to report the theft to the police who then do their best to find the automobile before it is dismantled.

Other consumer items can be dismantled or otherwise placed into an underground market within just a few hours of their theft. Alternatively, such items can be removed to the thief's home, where they are hidden from the eyes of the police or other investigators.

Even people are subject to being "stolen", or kidnapped. Again, the traditional response is to report a missing person to the police and other law enforcement agencies who then conduct a search for the missing person.

SUMMARY OF THE INVENTION

Upon receipt of a page or the occurrence of another triggering action, the invention determines its location using GPS signals and reports the location via cellular, two-way page or satellite telemetry. The telemetry is routed to a service provider, which takes an appropriate action, such as informing the lien-holder of the location of the object covered by the lien. The page may include a command that will cause the invention to actuate an actuator or a sensor and report the results via the cellular, two-way page or satellite telemetry.

In general, in one aspect, the invention features a triggerable remote controller, comprising a trigger signal including a command, a GPS processor coupled to the trigger signal, a position signal carrying position information generated by the GPS processor in response to the trigger signal, a telemetry transmitter coupled to the position signal, a telemetry transmit signal transmitted by the telemetry transmitter, the telemetry transmit signal carrying the position information, a trigger signal controller coupled to the trigger signal, an actuator coupled to the trigger signal controller, the trigger signal controller being configured to attempt to activate the actuator depending on the command.

Implementations of the invention may include one or more of the following. The trigger signal source may comprise a page receiver. The trigger signal may activate when the page receiver receives a page. The trigger signal controller may be coupled to the telemetry transmitter. The trigger signal controller may be configured to transmit to the telemetry transmitter a command status signal indicating whether the actuator had been actuated. The command status signal may be incorporated into the telemetry transmit signal. The trigger signal controller may be coupled to an apparatus controller. The trigger signal controller may be configured to transmit to the apparatus controller a command status signal indicating whether the actuator had been actuated. The apparatus controller may be configured to transmit to the trigger signal controller an additional command and the trigger signal controller may perform a function in response to the additional command. The triggerable remote controller may further comprise a second actuator. The trigger signal controller may attempt to actuate the second actuator in response to the additional command. The triggerable remote controller may further comprise a sensor. The trigger signal controller may attempt to access the sensor in response to the additional command.

In general, in another aspect, the invention features a triggerable remote controller comprising a trigger signal including a command, a GPS processor coupled to the trigger signal, a position signal carrying position information generated by the GPS processor in response to the trigger signal, a telemetry transmitter coupled to the position signal, a telemetry transmit signal transmitted by the telemetry transmitter, the telemetry transmit signal carrying the position information, a trigger signal controller coupled to the trigger signal, a sensor coupled to the trigger signal controller, the trigger signal controller being configured to attempt to access the sensor depending on the command.

Implementations of the invention may include one or more of the following. The trigger signal source may comprise a page receiver. The trigger signal may activate when the page receiver receives a page. The trigger signal controller may be coupled to the telemetry transmitter. The trigger signal controller may be configured to read information from the sensor when it accesses the sensor. The trigger signal controller may be configured to transmit the information to the telemetry transmitter. The information may be incorporated into the telemetry transmit signal. The trigger signal controller may be coupled to an apparatus controller. The trigger signal controller may be configured to read information from the sensor when it accesses the sensor. The trigger signal controller may be configured to transmit the information to the apparatus controller. The apparatus controller may be configured to transmit to the trigger signal controller an additional command in response to the information. The trigger signal controller may perform a function in response to the additional command. The triggerable remote controller may further comprise an actuator. The trigger signal controller may attempt to actuate the actuator in response to the additional command. The triggerable remote controller may further comprise a second sensor. The trigger signal controller may attempt to access the second sensor in response to the additional command.

In general, in another aspect, the invention features a method for remotely controlling an object comprising receiving a page incorporating a command; determining, in response to the page, the location of the object using GPS signals; transmitting the location of the object via telemetry; attempting an action in response to the command.

Implementations of the invention may include one or more of the following. The method may further comprise including in the telemetry an indication of whether the function was performed. Attempting an action may comprise actuating an actuator. The method may further comprise including in the telemetry an indication of whether the actuator was actuated. Attempting an action may comprise sensing information from a sensor. The method may further comprise including in the telemetry the information sensed from the sensor.

In general, in another aspect, the invention features a GPS antenna comprising a housing having a grommet shape, an antenna configured to receive a GPS signal, and the antenna being embedded in the housing.

BRIEF DESCRIPTION OF THE DRAWINGS

FIG. 5 is a block diagram of the formatter.

FIG. 6 is a representation of the data received from the GPS receiver by the data selector.

FIG. 7 is a representation of the data output from the data selector.

FIG. 16 is a perspective view and a block diagram of an antenna system according to one embodiment of the present invention.

DESCRIPTION OF THE PREFERRED EMBODIMENTS

Figure 1:
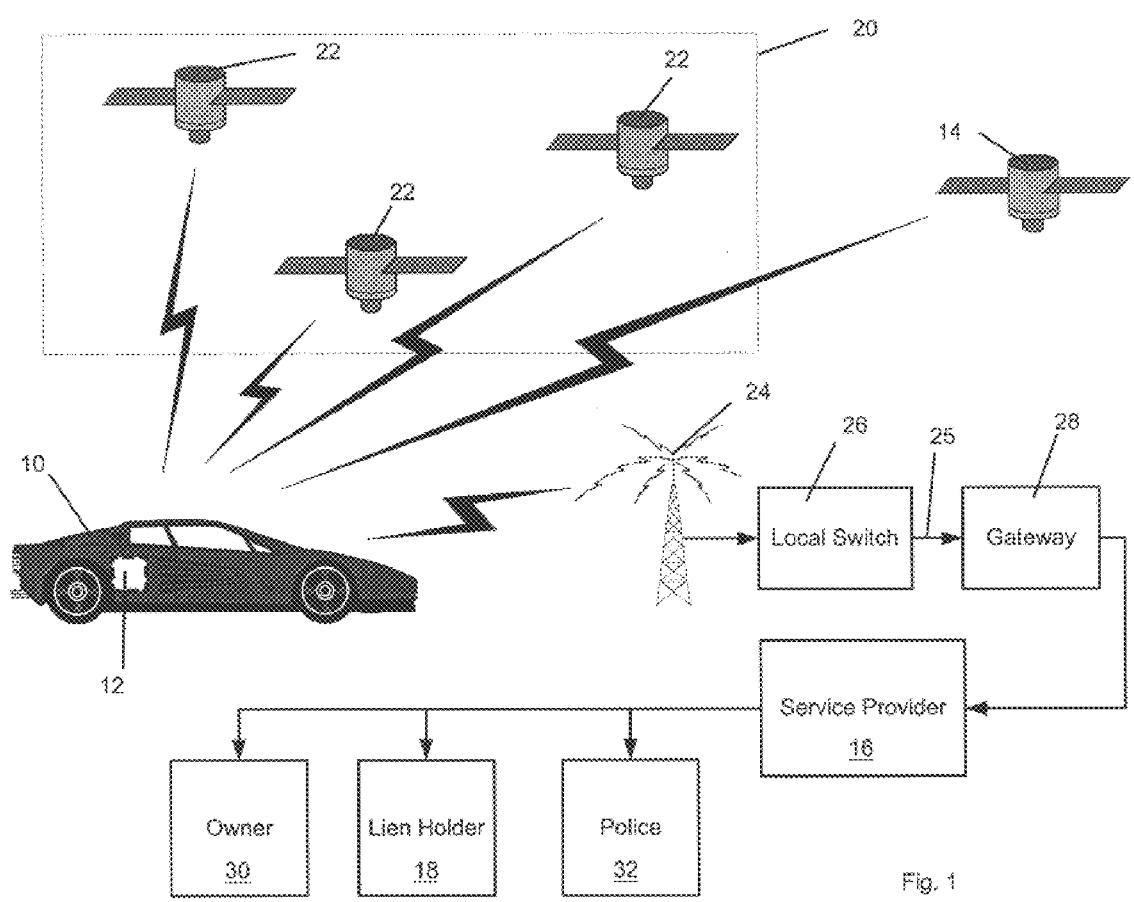
FIG. 1 is a block diagram of a system incorporating one embodiment of the invention.

An object 10, such as an automobile, contains a triggerable location-reporting apparatus 12, as shown in FIG. 1. The apparatus 12 is most likely hidden somewhere in the automobile, and may even be integrated into the body or the engine. For example, the apparatus may be integrated into the automobile's Primary Computer Module. The apparatus can either be connected to the power source associated with the object, such as the automobile battery, or it may have a self-contained power source or sources, as further discussed below.

The apparatus 12 receives a page from the paging satellite 14 preferably initiated by personnel or some automatic device located at the service provider 16. The page request can be initiated from any source. The service provider 16 accepts requests from customers to locate objects that have been lost, stolen or otherwise hidden. For example, a lienholder 18 may request that the service provider 16 locate an object for which the debtor has fallen into default. The service provider's response is to send a page to the apparatus 12.

The page need not originate in the paging satellite 14 but can originate in any system capable of sending out pages. For example, a cellular network may be capable of sending out pages and could be used instead of the paging satellite 14. Further, the system need not use a page to communicate between the service provider 16 and the apparatus 12 but can use any system that allows the service provider 16 to uniquely address the apparatus 12 via a broadcast signal. For example, very low frequency signals or HF radio signals could be used to communicate between the service provider 16 and the apparatus 12.

When the apparatus 12 receives the page it determines its location and direction of movement by accessing the signals of the GPS system 20, which comprises a plurality of satellites 22 broadcasting signals which can be used to determine an object's location and heading anywhere on the earth. The apparatus 12 then formats the location information into a cellular telemetry stream and transmits it via the cellular system's telemetry channels.

In the AMPS (Advanced Mobile Phone System) cellular system, which is the analog cellular system used in the United States, each cellular base station has 832 channels. The 832 channels are divided among at least two competing cellular carriers. Each cellular carrier uses 21 of the 416 channels to carrying control signals. Each control channel includes a Forward Control Channel (FOCC) and a Reverse Control Channel (RECC).

The cellular base station uses the FOCC to send information to cellular telephones and the cellular telephones send information back to the cellular base station via the RECC. The FOCC and RECC are used to establish a cellular telephone call through a local switch. Once the cellular telephone call is established, the call is moved to one of the non-control channels and the released control channel is made available to establish other cellular telephone calls.

The cellular base station broadcasts a System Identification ("SID") signal, which identifies the cellular system to cellular telephones receiving it. When a cellular telephone is turned on, it compares the SID signal it receives against an SID stored within the telephone, which identifies the cellular telephone's home system. If the received SID is not the same as the stored SID, the cellular telephone is "roaming" and the "roam" indicator on the telephone is illuminated.

Subsequently, the cellular telephone transmits its identity to the cellular base station via the RECC. The RECC transmission includes the telephone's Mobile Identification Number ("MIN"), which is a unique 10-digit number (analogous to a telephone number including an area code) that is programmed into the cellular telephone. The first six digits of the MIN identify the cellular telephone's home system. The RECC also includes an Electronic Serial Number ("ESN"), a unique 32-bit serial number permanently stored in the cellular telephone which uniquely identifies the cellular telephone. The cellular base station will receive the MIN and ESN through the RECC and determine that the MIN does not correspond to a local number. Using the MIN, the cellular base station will determine the home system for the cellular telephone and send a validation signal to that system. The cellular local switches in the United States are interconnected through the Intersystem Signaling Network, IS-41, which allows them to send and receive validation information.

The validation signal, known under IS-41 as a RegistrationNotification Invoke (REGNOT) message, includes the cellular telephone's MIN and ESN. The REGNOT message also includes the identity of the cellular base station sending the message. The cellular telephone's home system will respond with a RegistrationNotification Return Result (regnot) message. In the regnot message, the cellular telephone's home system will either indicate that it will take financial responsibility for calls made by the cellular telephone or it will refuse to validate the cellular telephone. If validation occurs, a subsequent exchange of messages establishes the features (such as call forwarding) available to the cellular telephone.

The validation process just described uses the cellular system's control channels. Again, once a cellular telephone call is initiated the control channel that was used to set up the call is released for other purposes.

At least two companies, Cellemetry and Microburst, have developed systems which allow the transmission of information from a cellular telephone to a gateway using the validation signals. Cellemetry, for example, connects a Cellemetry Service Gateway to an IS-41 on a local switch and registers an SID on the IS-41 network. Cellemetry radios transmit RECC signals to local cellular base stations. The local cellular base stations transmit a validation signal to a Cellemetry gateway.

In the RECC signal transmitted from the Cellemetry radio, the MIN normally transmitted in a RECC signal is replaced by a 10-digit equipment identification number, identifying a Cellemetry gateway. The 32-bit ESN normally transmitted can be used as a "payload" to transmit information from the Cellemetry radio or a device incorporating the Cellemetry radio to the Cellemetry gateway. The Cellemetry gateway strips the payload information from the validation signal and sends it to a service provider.

The Microburst system is similar except that the payload is 55 bits instead of 32.

A similar system is used in digital cellular telephone applications such as CDMA and TDMA systems.

Returning to FIG. 1, upon receipt of the page from page satellite 14, the apparatus 12 determines the location and direction of movement, if any, of object 10 using the GPS signals from the GPS system 20. The apparatus then formats the location and movement information into the payload portion of a cellular RECC signal and transmits it to a local cellular base station 24. The MIN portion of the RECC signal may contain a unique MIN or it may be a MIN that is common to all triggerable location-reporting apparatus serviced by a common service provider. Alternatively, the MIN may be different for each of the apparatus.

The cellular base station 24 determines that the apparatus 12 is a roamer and passes a validation signal into the IS-41 system 25 via a local switch 26. The common MIN will cause the cellular base station to direct the validation signal to a gateway 28. The gateway 28 receives the validation signal and reads the payload data and provides it to the service provider 16. The gateway may also use the information regarding the cellular base station that originated the validation signal to determine an approximate location of the cellular telephone and pass that information on to the service provider 16 as well. A company such as Cellemetry or Microburst may provide the gateway or it may be provided by the service provider 16.

The gateway will preferably respond to the cellular base station with a regnot message indicating that the requested roamer status has been denied. The cellular base station will then know not to try to allocate a voice channel to the apparatus. Alternatively, the gateway may return a message to the cellular base station indicating that the request should be dropped. The cellular base station will eventually allow the request to expire. Further, under some circumstances, the cellular base station may signal the apparatus to turn on a voice channel.

The service provider 16 can now communicate the location of the object 10 to the owner 30, lien-holder 18, or to the police 32.

Figure 2:
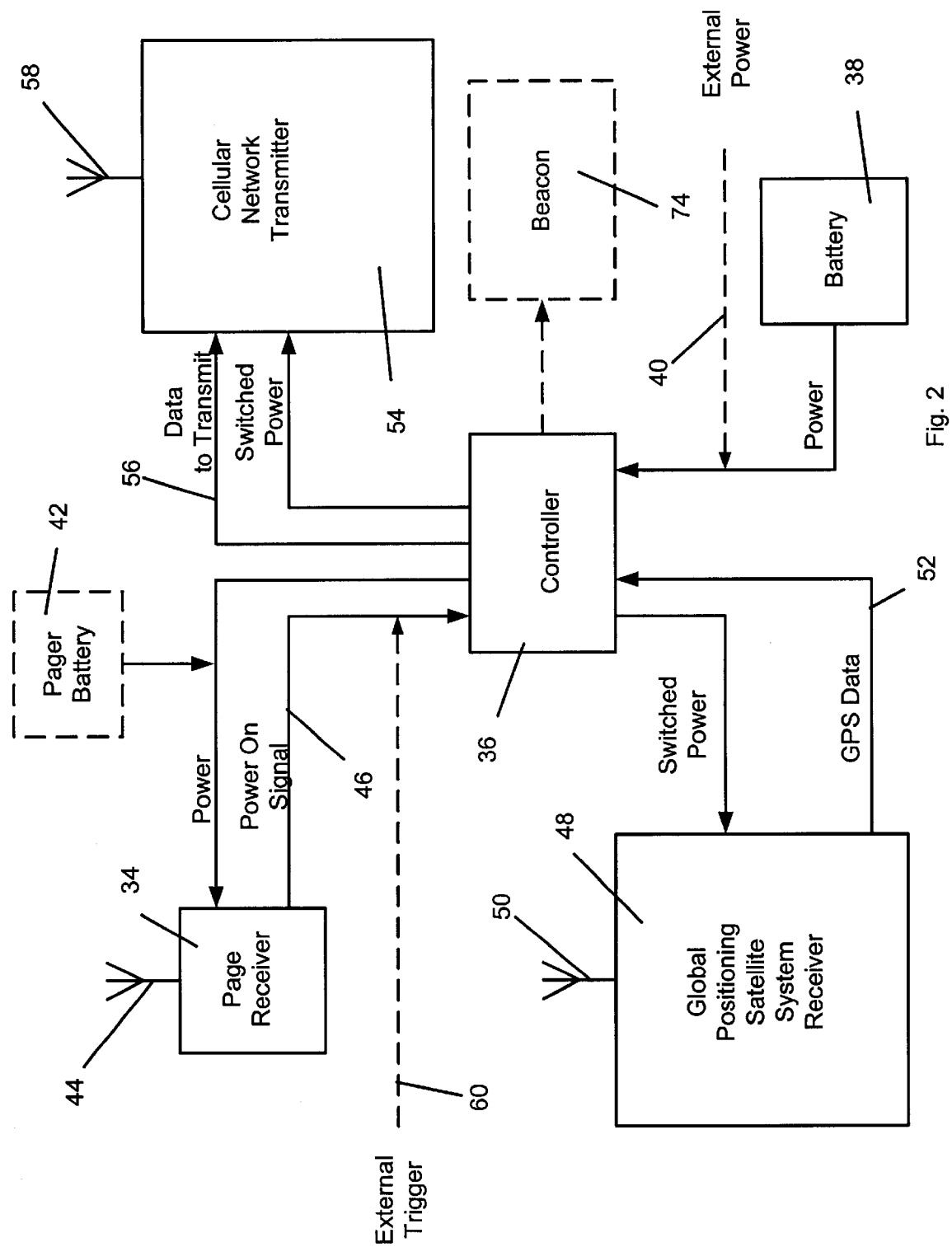
FIG. 2 is a block diagram of one embodiment of the apparatus according to the invention.

A block diagram of the apparatus is shown in FIG. 2. A page receiver 34 receives power through controller 36, which may be a microprocessor such as a PIC processor. Preferably, the power is passed directly through the controller 36. Alternatively, the power may bypass the controller entirely and be applied directly to the page receiver 34. A battery 38 supplies power to the controller 36. Alternatively, an external power source 40 may supply power to the controller 36. As still another alternative, the page receiver 34 may have a pager battery 42 separate from the power supplied to the remaining electronics in the apparatus 12. A separate battery allows the page receiver 34 to remain in a standby state for a long period of time without draining the power supply for the rest of the apparatus.

When the page receiver 34 receives a page over antenna 44 that is addressed to the page receiver 34, the page receiver 34 transmits a "power-on" signal 46 to the controller 36. The controller 36 then switches power to a global position satellite system receiver 48, which receives GPS signals via antenna 50. The GPS receiver 48 acquires the GPS signals and determines a variety of position data regarding apparatus 12. The GPS receiver sends the GPS data 52 to the controller 36.

The controller 36 buffers and reformats the GPS data into a form acceptable to a cellular network transmitter 54. The controller then switches power to the cellular network transmitter and sends a "data to transmit" signal 56 to the cellular network transmitter 54. After the cellular network transmitter (or the controller 36 or a similarly configured modem (not shown)) has had an opportunity to format the "data to transmit" into the payload section of the RECC signal, the cellular network transmitter 54 transmits the RECC signal, including the GPS payload, via antenna 58. The cellular antenna 58 may be combined with the GPS antenna 50. One or both of these antennas (or their combination) may comprise dielectric and conducting materials embedded in the object or attached to it with an adhesive or some other attachment mechanism.

Preferably, the power-on signal 46 is provided to the controller 36 as the result of a page received by the page receiver 34, as discussed above. Alternatively, an external trigger 60 may provide the power-on indication to the controller 36.

Figure 3:
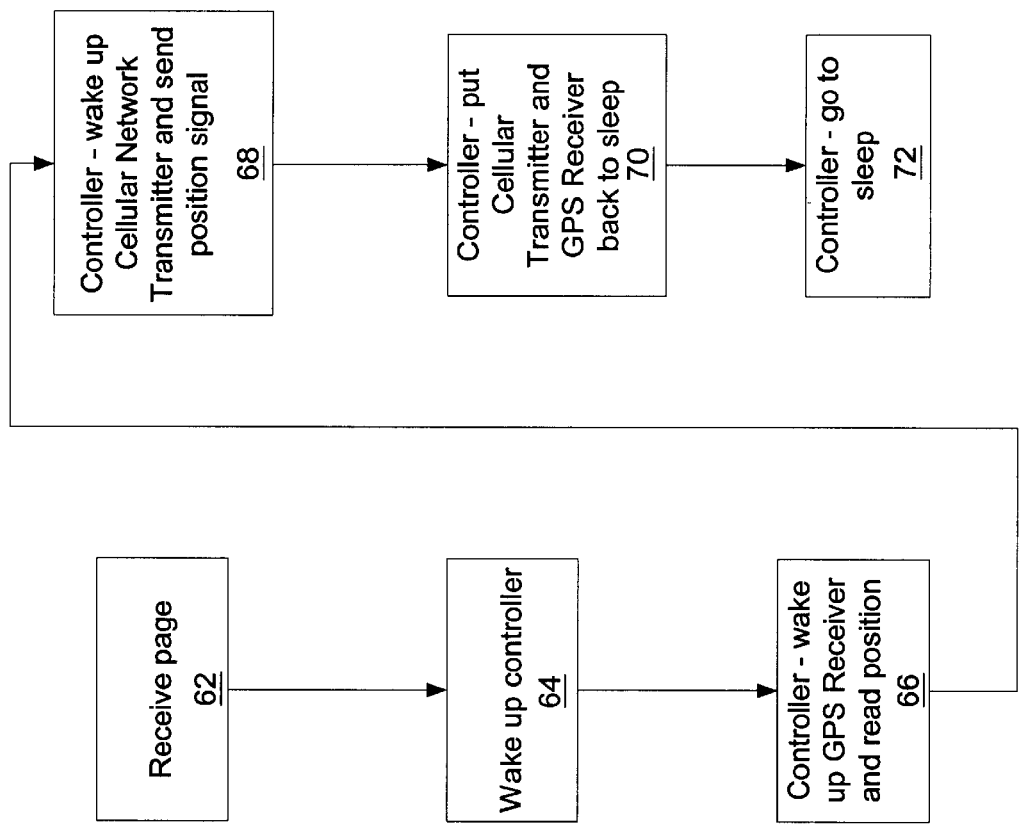
FIG. 3 is a flow chart of the power management feature.

A flow chart of the power management provided by the controller 36 is illustrated in FIG. 3. The apparatus 12 receives a page 62. The page receiver wakes up the controller 64. The controller wakes up the GPS receiver and reads the GPS position information 66. The controller wakes up the cellular network transmitter and sends it formatted position information 68. The transmitter transmits the MIN and the payload to the cellular base station which forwards the data via the RECC transmission to the gateway. The controller then puts the cellular network transmitter and GPS receiver back to sleep 70. The controller then goes back to sleep 72. With this power management approach, significant power is being used only when position information is being transmitted over the cellular network. The rest of the time the only drain on system power is the page receiver, which has a very low power requirement when it is waiting for a page. Even this power drain can be eliminated by using a separate pager battery 42, as shown in FIG. 2.

The controller may store the last location signal it receives from the GPS receiver. Consequently, if the apparatus receives a subsequent page and the GPS receiver cannot perform its function (because, for example, it is shielded from GPS satellite signals), the apparatus will report the stored position. The apparatus may also report the amount of time that has elapsed since the position information was stored.

In another embodiment, the apparatus may turn on a homing beacon 74 (see FIG. 2) if the GPS receiver is unable to perform its function. The homing beacon will allow the object to be tracked by a receiver tuned to the beacon frequency.

Figure 4:
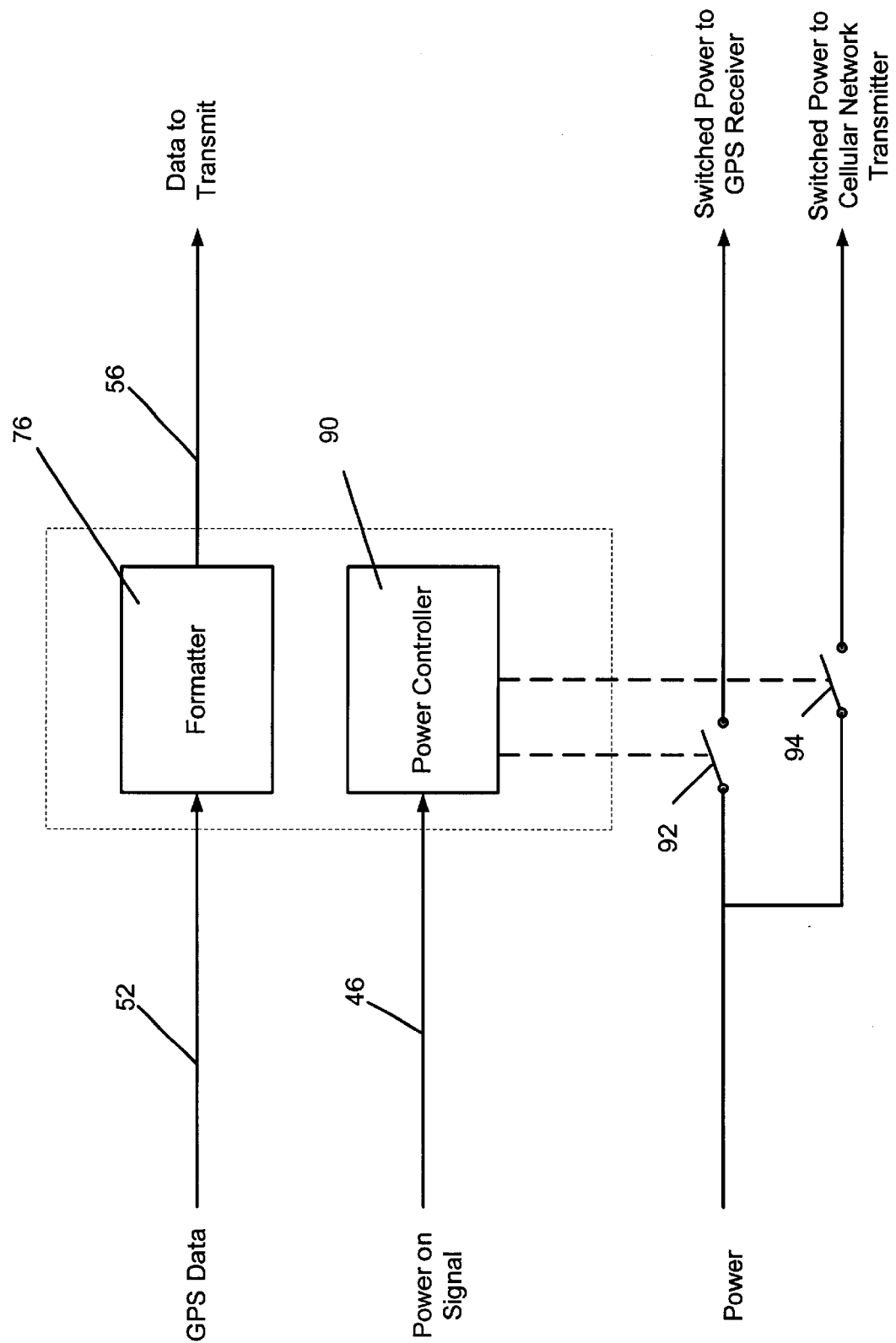
FIG. 4 is a block diagram of the controller.

A block diagram of the controller is shown in FIG. 4. GPS data 52 is received by a formatter 76 from the page receiver 34 where it is buffered and formatted into a form acceptable to the cellular network transmitter 54. The formatter 76 buffers the reformatted signal and then transmits it as a "data to transmit" signal 56.

A block diagram of the data formatter is illustrated in FIG. 5. GPS data 52 is buffered by a buffer 78. A data selector 80 selects data from the buffered GPS data 52 to be transmitted to the cellular network transmitter 54. A buffer and formatter 82 buffer the selected data and convert it into a format acceptable to the cellular network transmitter 54. A memory 84 may be provided to store the last reported position from the GPS receiver. The properly formatted "data to transmit" signal 56 is then transmitted to the cellular network transmitter 54.

An example of the data selector function is illustrated in FIGS. 6 and 7. The Motorola® GT Plus Oncore™ GPS family of chips produces an digital output signal 86 containing bits representing the latitude, longitude, height, velocity, and heading of the apparatus 12 and the current time, as shown in FIG. 6. Similar products manufactured by other companies may be used instead of the Motorola product. Preferably, only the bits representing latitude, longitude, velocity and heading 88 are included in the data to transmit signal 56, as shown in FIG. 7. Preferably, the bits representing height and current time are discarded (although they may be sent in alternative embodiments). Further, it may be desirable to change the order that the various portions of the information are transmitted. For example, it may be desirable to send the heading portion first. The data selector selects the data to be transmitted and arranges it into the desired order.

Returning to FIG. 4, the controller also performs a power management function, as discussed above. Upon receipt of the power-on signal 46 from the page receiver 34, a power controller 90 opens and closes switch 92 to apply and remove power to the GPS receiver 48. The power controller 90 also opens and closes switch 94 to apply and remove power to the cellular network transmitter 54.

Figure 8:
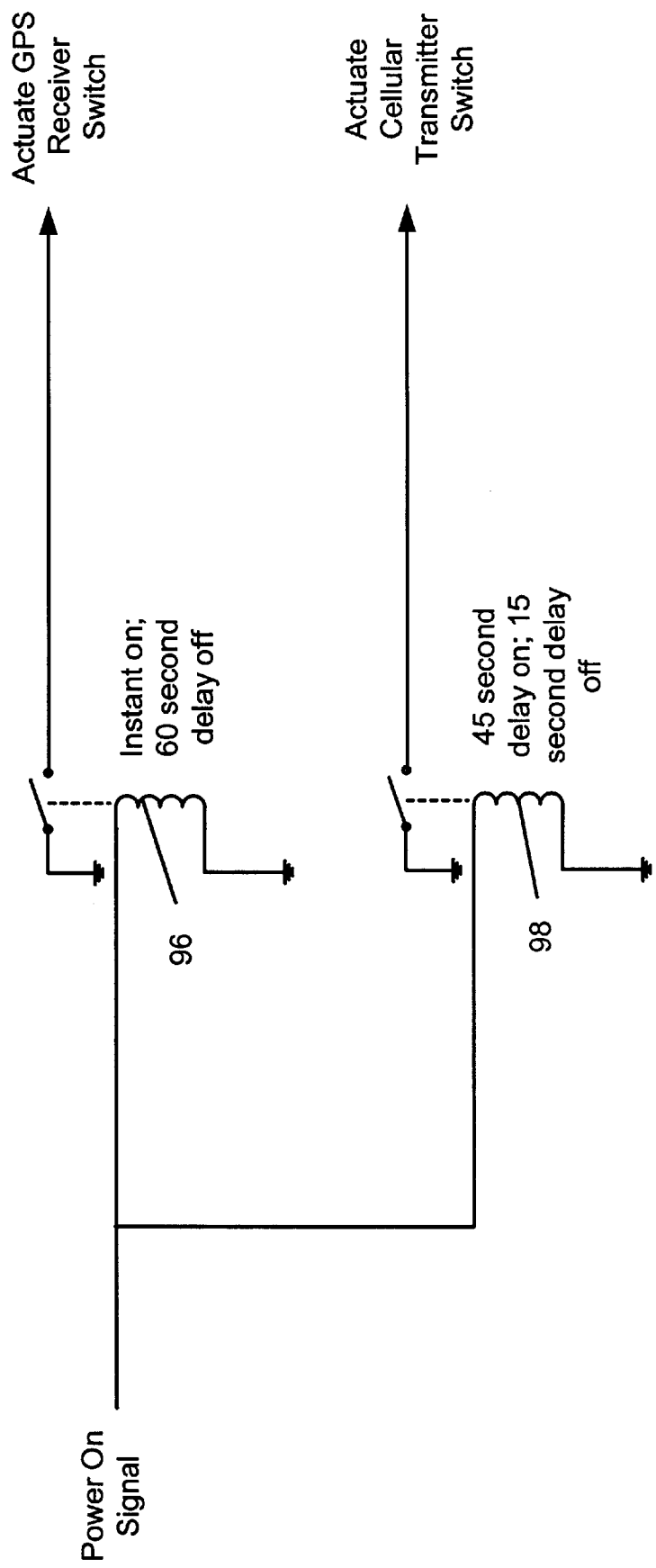
FIG. 8 is a block diagram of the power controller.

A functional block diagram of the power controller is illustrated in FIG. 8. While FIG. 8 shows the use of delayed action relays it should be understood that any electronics that provide the desired function may be used. The power-on signal from the page receiver is applied to two delayed action relays. Relay 96 engages as soon as the power-on signal is applied, which causes switch 92 to close. Sixty seconds later relay 96 disengages, which causes switch 92 to open. The sixty-second power off delay is adjustable as necessary to allow the GPS receiver 48 sufficient on time to acquire the GPS satellites and determine the location of the apparatus.

Relay 98 actuates 45 seconds after the power-on signal is applied. Again, this delay is adjustable so that power is applied to the cellular network transmitter 54 only after the data to transmit signal 56 has been prepared. The cellular network transmitter 54 is turned off 15 seconds after it is turned on, which allows the cellular network transmitter adequate time to transmit the RECC signal to the cellular base station.

The controller may have the ability to determine when the apparatus is moving. It can accomplish this by comparing the location data from the GPS location signal to the location data stored in the memory 84 or by examining the velocity data reported by the GPS receiver. In either case, the controller may leave the GPS receiver power on when the apparatus is moving. The controller can then cause the location data to be reported from time to time (e.g. every five minutes) through the cellular telemetry network by applying power to the cellular network transmitter for a short period of time. The controller may keep the GPS receiver operational for a period of time after the apparatus stops moving. This allows the apparatus to provide continuous updates on its position while it is moving.

Figure 9:
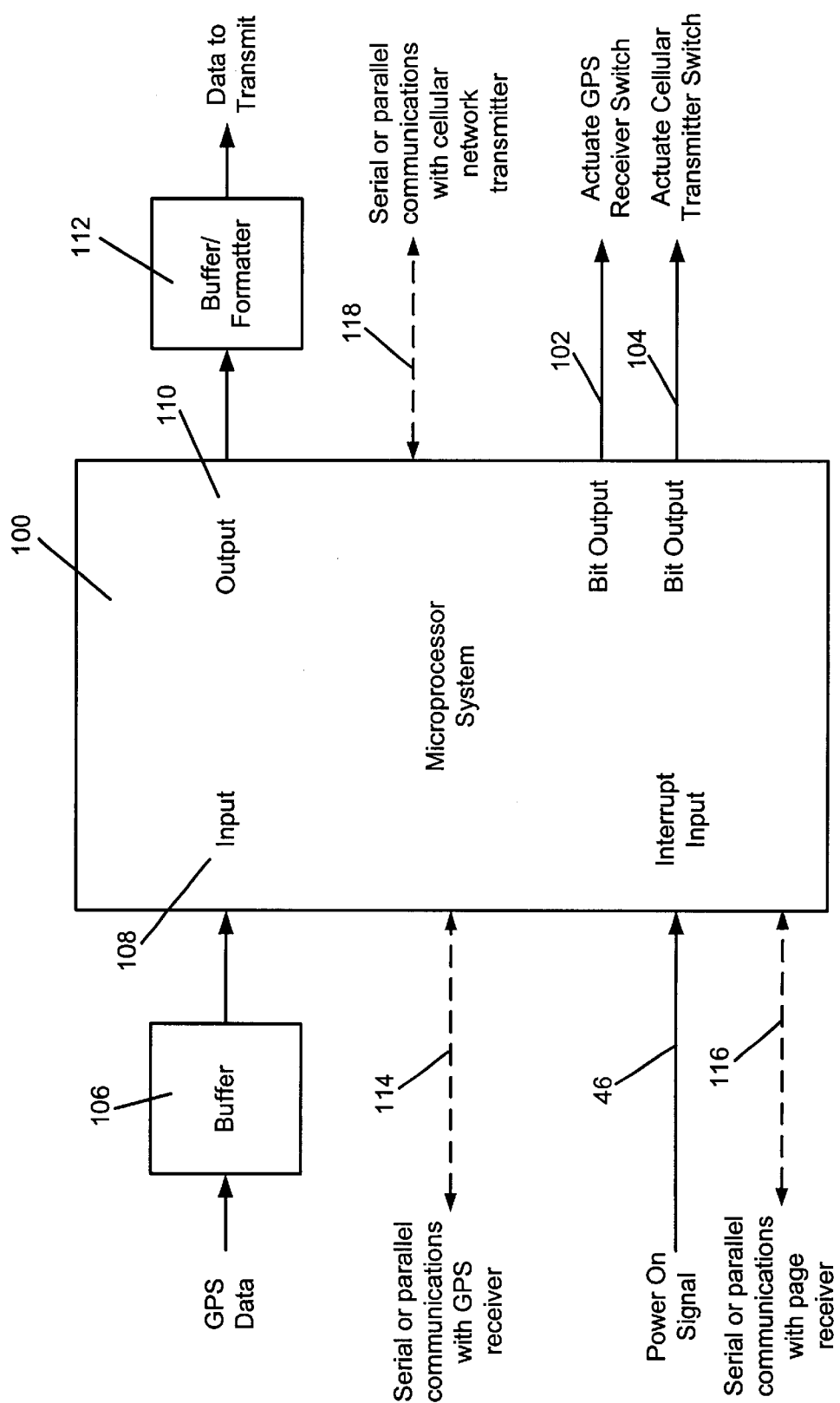
FIG. 9 is a block diagram of an embodiment of the controller.

Another implementation of the elements enclosed in the dashed box in FIG. 4 is shown in FIG. 9. A microprocessor system 100 receives the power-on signal 46 from the page receiver 34. The microprocessor system may include an interconnected microprocessor, program storage area and data storage area. The storage areas may include random access memory ("RAM") and read only memory ("ROM"). Alternatively, the microprocessor system may be implemented entirely with discrete logic elements or application specific integrated circuits ("ASIC"). The microprocessor system may be implemented with a combination of a microprocessor and discrete and ASIC logic elements.

When the microprocessor receives the power-on signal its stored program causes it to assert and un-assert bit outputs 102 and 104 in sequence, as described above. The program may be developed in assembly language, machine language or a higher order language such as C++ or the function of the program may be accomplished with discrete logic or ASICs or a combination of any of these. Preferably, the program is compiled and linked as necessary and stored in one of the storage areas for execution by the microprocessor to accomplish the described functions.

A buffer 106 receives GPS data 52 from the GPS receiver 48 and buffers it. The microprocessor system 100 extracts the buffered data through input 108, selects the data to be sent out as payload and rearranges it as necessary. The microprocessor system outputs the selected and arranged data through output 110 to a buffer/formatter 112, which formats the "data to transmit" signal 56. Alternatively, the function of the buffer/formatter 112 and/or the buffer 106 may be accomplished by the microprocessor system 100.

Alternatively, the microprocessor system 100 may communicate with the GPS receiver 48, the page receiver 34 and the cellular network transmitter 54 via serial or parallel communication lines 114, 116 and 118, respectively.

Figure 10:
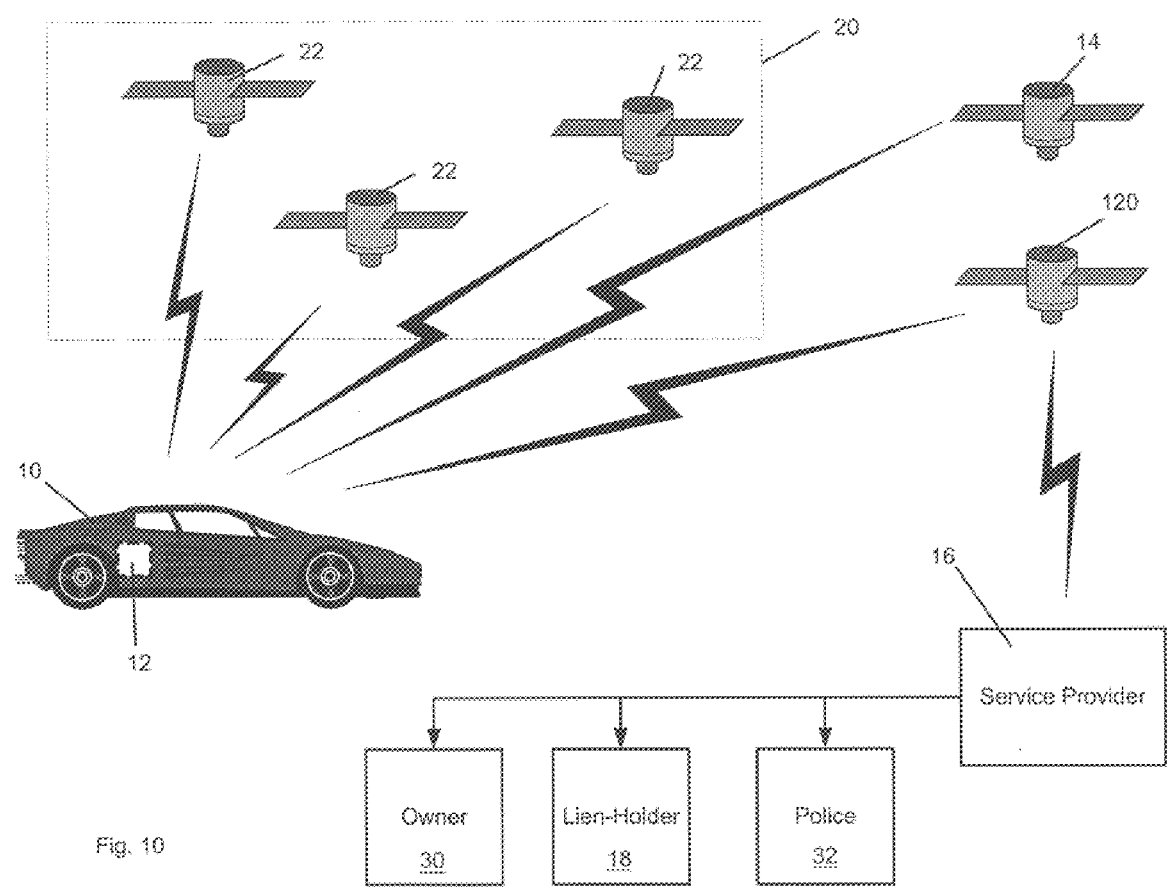
FIG. 10 is a block diagram of an embodiment of a system incorporating the invention.

An alternative embodiment of the system that does not use the cellular network is illustrated in FIG. 10. In this embodiment, the apparatus 12 communicates its location and heading to the service provider 16 through telemetry communications through satellite 120.

In use, for example in the automobile recovery application, a lien-holder would contact the service provider and identify an automobile that the lien-holder wants located. The service provider would cause a page to be sent to the apparatus secured within the automobile. The apparatus would receive the page, ascertain its location using the GPS system, and return the location and heading information to the service provider. The service provider could then tell the lien-holder the location and heading of the automobile. Because of the power management feature described above, the service provider could "track" the automobile as it is being driven, providing the lien-holder with multiple readings regarding the automobile's location. Further, the apparatus may be configured to provide multiple updates of its position while it is moving.

The same function could be supplied with respect to any object, including largescreen televisions, computers or any other item.

Figure 11:
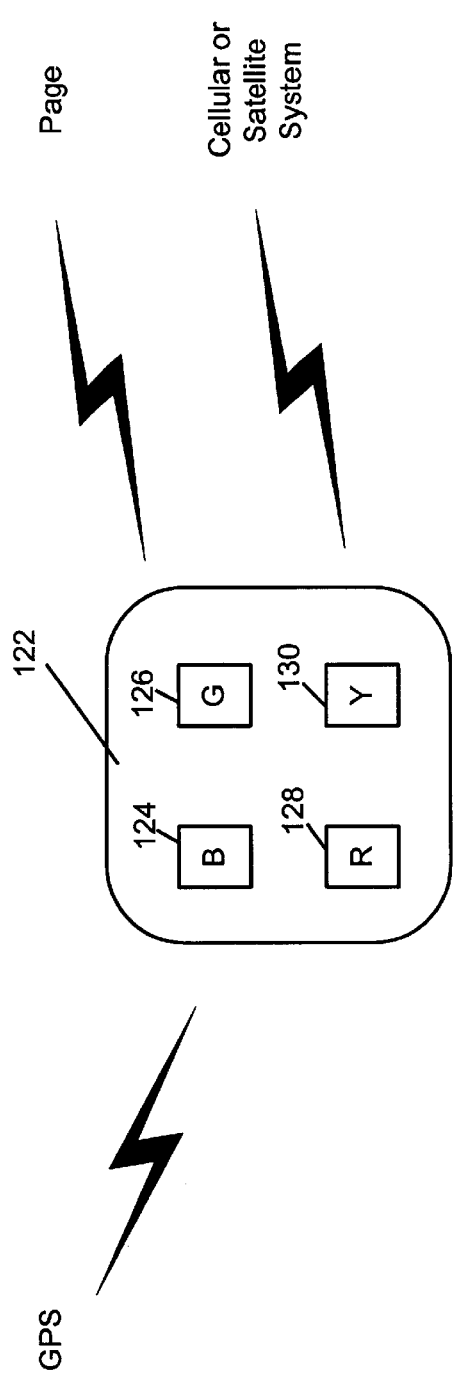
FIG. 11 is a plan drawing of a panic switch according to the present invention.

The apparatus could be used to provide a "panic switch" capability, as illustrated in FIG. 11. For example, panic switch 122 includes a blue switch 124, a green switch 126, a red switch 128 and a yellow switch 130. Pressing the switches in the correct order (e.g. red, red, green, yellow) will cause the external trigger 60 (FIG. 2) to actuate, causing the position of the panic switch to be reported to through the system illustrated in FIG. 2 to the police or other agency. The police can then query the apparatus 12 located in the panic switch 122 through the service provider in order to track its location if it is moved.

Figure 12:
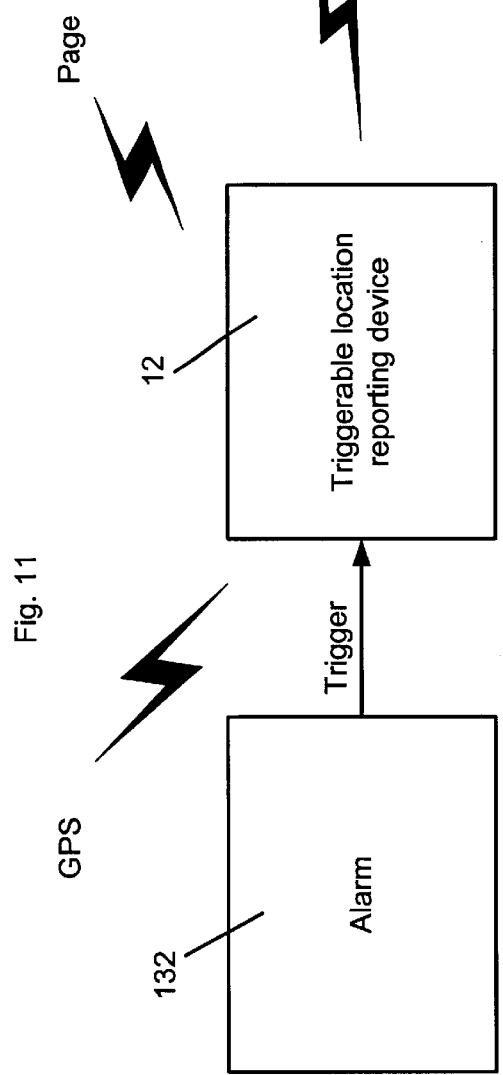
FIG. 12 is a block diagram of an alternative embodiment of the present invention.

The apparatus could be adapted to respond to alarm conditions associated with an object, such as the traditional car alarm, as illustrated in FIG. 12. For example, when car alarm 132 is tripped, it actuates external trigger 60 (FIG. 2) causing the location of the automobile to be reported via the system shown in FIG. 2. Subsequently, the police, the owner or anyone else with the capability can track the automobile through the service provider by sending pages to the apparatus 12.

Figure 13:
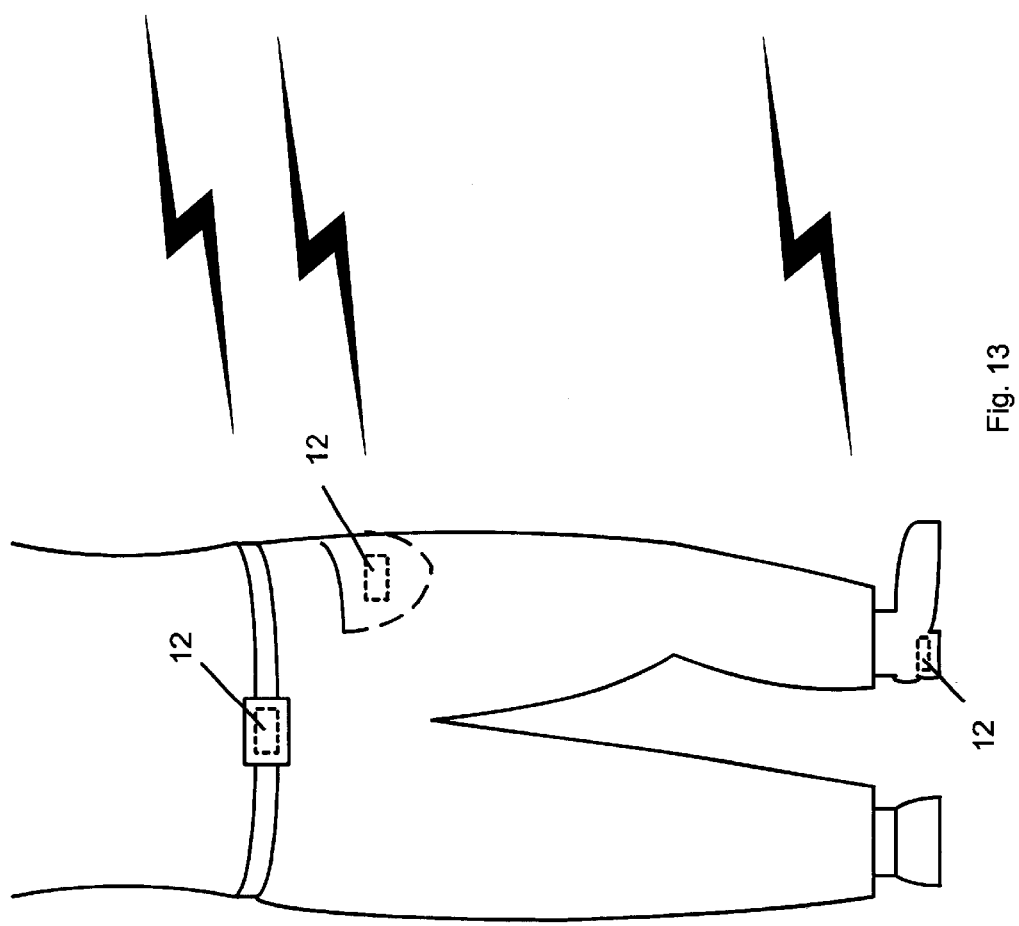
FIG. 13 is a perspective drawing of the invention incorporated in articles of clothing.

The apparatus 12 could be used to locate people, as illustrated in FIG. 13. The apparatus 12 could be hidden in a belt buckle or in the heel of a shoe. Subsequently, if another person became concerned about the location of the person wearing the apparatus, the concerned person could have the service provider page the apparatus 12 and locate and track it as described above.

Figure 14:
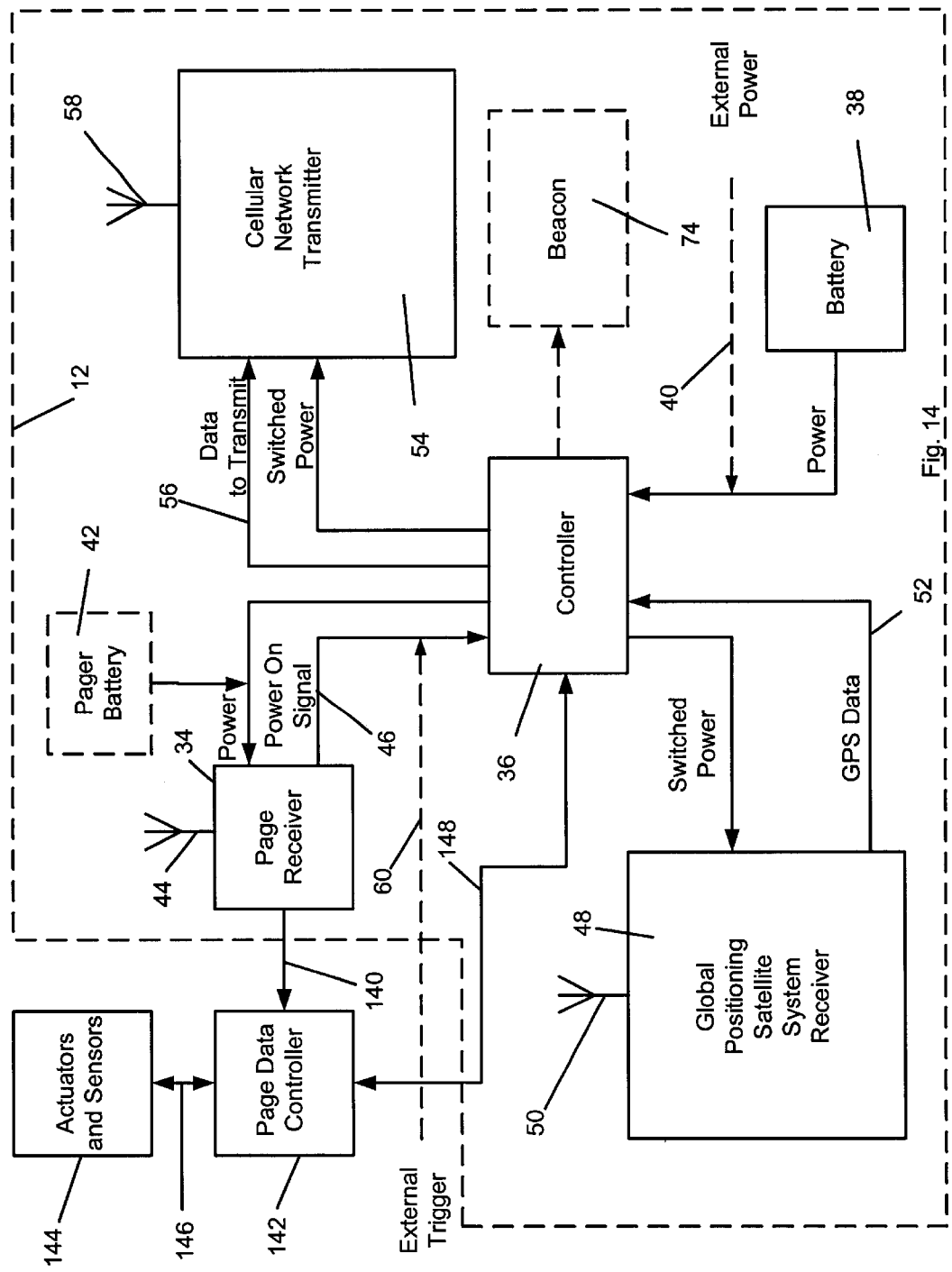
FIG. 14 is a block diagram of an embodiment of the invention.

In another embodiment, illustrated in FIG. 14, the signal from the paging satellite 14 includes command data to be communicated to apparatus 12. The page receiver 34 extracts the command data 140 and transmits it to a page data controller 142, which acts on the commands. The page data controller 142 can be incorporated into the apparatus 12 or it can be a separate device connected to the apparatus 12 by a communications medium such as a cable or an electromagnetic or other type of connection.

The page data controller responds to the command data by actuating or sensing actuators and sensors 144 over signal lines 146. The actuators can be any type of actuator. For example, if the apparatus 12 is installed in an automobile, truck or other wheeled vehicle, the actuators may be the door locks. In that case, the command data may command that the door locks be closed (or opened) in which case the page data controller causes the door locks to be closed (or opened). The page data controller can interface directly with the door locks or it may interface through a microprocessor already present in the automobile.

Other examples of actuators in the automobile context include: an actuator to remove the ground from the door locks so that they cannot be opened; an actuator to lock the trunk or hood of the automobile; an actuator to arm an alarm system; an alarm to trigger the alarm system; an actuator to cause the lights in the automobile to blink on and off; or an actuator to trigger a kill switch to prevent the automobile engine from being started or to turn it off if it is already on.

The page data controller 142 may send a signal to the controller 36 via controller communications lines 148 indicating whether it has complied with the command. The controller 36 may respond by issuing additional commands to the page data controller 142 over the controller communications lines 148 or it may include the information in the data to transmit 56 to be transmitted to the service provider.

The page data controller 142 also reads information from sensors (part of block 142) and reports the information to the controller 36 via controller communications lines 148. The page data controller 142 may be incorporated into the controller 36 or it may be a separate module. The controller communications lines 148 may be cables or any other communications medium. The controller 36 may act on the data directly by sending commands back to the page data controller 142 via the controller communications lines 148 or it may include the data in the data to transmit 56 for transmission back to the service provider 16. For example, in the context of long-haul trucking, the sensor may be attached to a locking mechanism on the truck's trailer that senses if the lock has been opened. The page data controller 142 senses the state of the locking mechanism and reports it to the controller 36 via the controller communications lines 148. The controller 36 can then incorporate that information into the data to transmit 56, leaving it to the service provider (or some other entity) to act on the information. Alternatively, the controller 36 can send a command back to the page data controller 142 commanding it to close the lock. The page data controller 142 would then actuate a lock actuator included in actuators and sensors 144 that would cause the trailer to lock.

Figure 15:
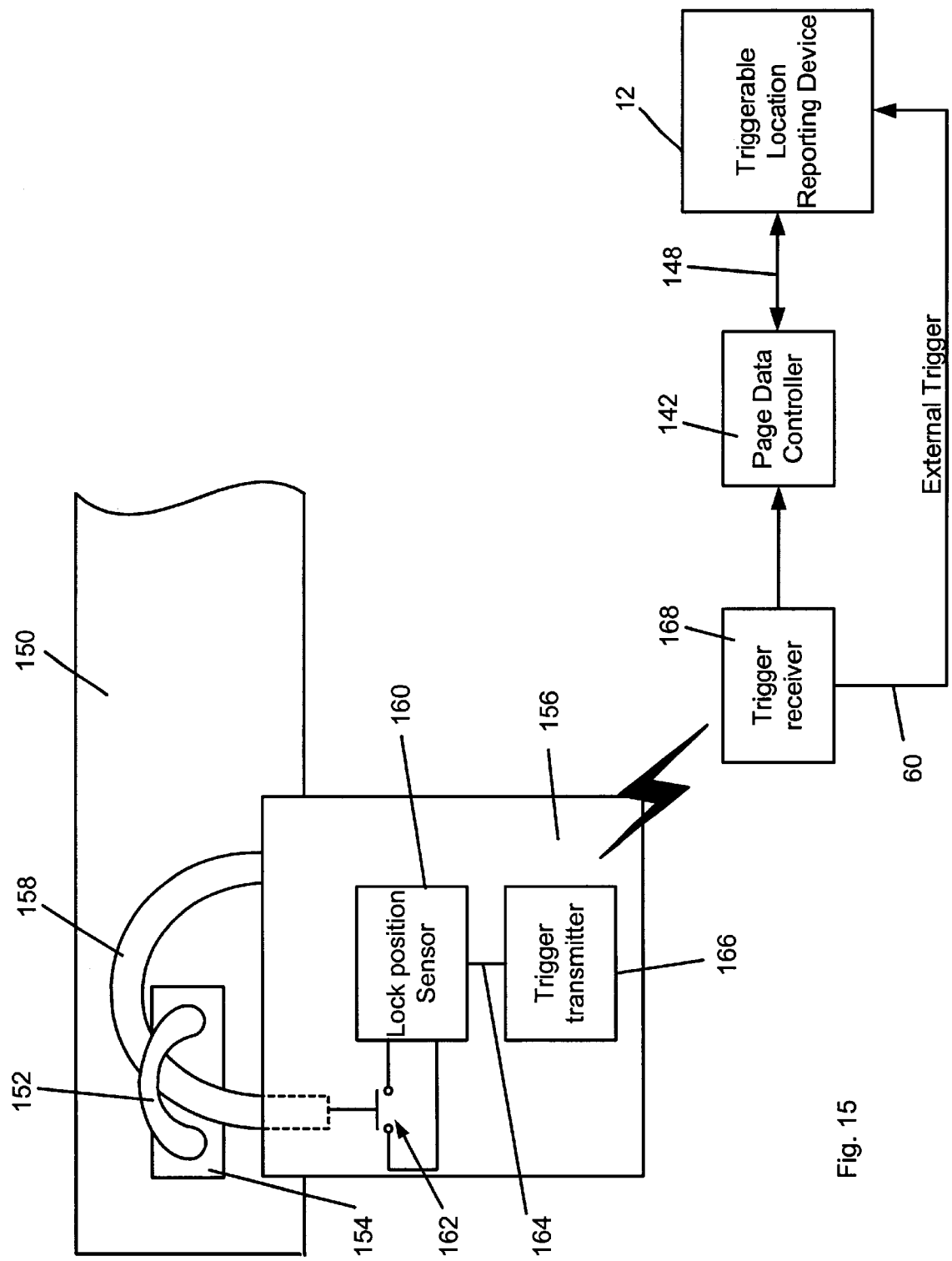
FIG. 15 is a block diagram of a sensor according to one embodiment of the present invention.

An example of a locking mechanism adapted to trigger a triggerable location reporting device is illustrated in FIG. 15. A hasp 150 is secured to one of the rear doors (not shown) of a trailer by a hinge (not shown). A staple 152, attached to the other of the rear doors (not shown) of the trailer, fits through a slot 154 in the hasp 150 when the two doors are closed. It will be understood by persons of ordinary skill in the art that the hasp and staple described above are one of many conventional ways of securing one door with respect to another.

A lock 156 includes a shackle 158 which extends from one side of the lock 156, through the staple 152, and into the other side of the lock 156. When the shackle 158 goes through the staple 152 as shown and both ends of the shackle 158 are secured in the lock 156 (i.e., the lock is in its "locked" position), the two rear doors cannot be opened. When the shackle 158 is released, through any conventional technique including the use of a key or a combination, one or both ends of the shackle 158 may be removed from the lock 156, freeing the hasp 150 from the staple 152 and allowing the two rear doors to be opened.

A lock position sensor 160 senses when the shackle 158 of the lock 156 is not in its locked position. The sensing device may be a switch 162 which closes (or, alternatively, opens) when the shackle 158 is in its locked position. Alternatively, the sensing device may be a two position switch, one position sensing when the shackle 158 is in its locked position and the other position sensing when the shackle 158 is not in its locked position. Alternatively, the sensor may be an optical sensor that detects the presence of the end of the shackle 158.

Another type of sensing device is a wire that runs through the shackle 158 and connects to points inside the lock on either side of the shackle 158 (or the shackle 158 may be conductive so that a wire is not needed). In that case, the sensing device will detect when the shackle 158 is not in place or when the shackle 158 is cut.

The lock position sensor 160 sends a signal 164 to a trigger transmitter 166 which communicates with a trigger receiver 168. The sensor may be configured so that it does not send the signal is opened properly, for example, with a key. The communication of the signal may be electromagnetic, electric, optic or any other means of transmitting a signal from one location to another. The trigger receiver 168, upon receiving the signal from the trigger transmitter 166 sends a signal to the page data controller 142. The page data controller 142 reports the trigger to the triggerable location reporting device 148 via the controller communications lines 148. The controller 36 within the triggerable location reporting device 148 can then incorporate that information into the data to transmit 56, leaving it to the service provider (or some other entity) to act on the information. Further, the trigger receiver can actuate the external trigger signal 60, which will initiate the sending of location data and other data to the service provider.

Other sensors in the automobile context include: a sensor to detect the speed of the automobile; a sensor to detect the number of miles the automobile has traveled; a sensor to detect the state of the door locks (which may have been actuated in response to a command from the page data controller 142); a sensor to detect whether the automobile windows are open; sensors to detect a variety of engine parameters; or a sensor that would allow access to all of the data gathered and stored in the automobiles computer.

An antenna system is illustrated in FIG. 16. The cable 170 from the antenna 172 that is supplied with the vehicle is interrupted by a splitter/combiner 174. The splitter/combiner 174 allows the vehicle antenna 172 to be used to receive page signals 176, transmit cellular telemetry signals 178, and continue to operate as an AM/FM antenna as it was originally intended.

Further, the grommet 180 that normally separates the antenna 172 from the vehicle 182 is replaced by an antenna 184 which is configured to be visually similar to grommet 180. Because the antenna 184 is visually similar to the grommet 180, antenna 184 is hidden from casual inspection and provides a covert apparatus for receiving GPS signals. A cable 186 carries the GPS signals from the GPS antenna 184 to the triggerable location reporting device 12.

The foregoing describes preferred embodiments of the invention and is given by way of example only. The invention is not limited to any of the specific features described herein, but includes all variations thereof within the scope of the appended claims.

What is claimed is:

1. A triggerable remote controller in an environment including: a source of GPS signals; a source of a trigger signal including a command; a cellular base station connected through a network to a gateway; the cellular base station being configured to expect a Reverse Control Channel signal including a Mobile Identification Number and an Electronic Serial Number, the triggerable remote controller comprising a GPS receiver responsive to the GPS signals for producing GPS data when enabled;

a cellular network transmitter coupled to the GPS receiver for formatting and transmitting when enabled a Reverse Control Channel signal including a formatted GPS data in the place normally occupied by the Electronic Serial Number and a Mobile Identification Number that will cause the cellular base station to send a Registration Notification Invoke signal including the formatted GPS data to the gateway;

a trigger signal receiver responsive to the trigger signal for producing an enable signal and for producing a command signal containing the command;

a trigger signal controller coupled to the trigger signal receiver and responsive to the command signal for attempting to activate an actuator depending on the command;

an enable controller coupled to the GPS receiver, the cellular network transmitter, and the trigger signal receiver;

the enable controller being configured to enable the GPS receiver and the cellular network transmitter upon receipt of the enable signal from the trigger signal receiver; and the enable controller being configured to disable the GPS receiver and the cellular network transmitter.

2. The triggerable remote controller of claim 1 wherein the trigger signal receiver comprises a page receiver;

the trigger signal receiver produces the enable signal when it receives a page.

3. The triggerable remote controller of claim 1 wherein the trigger signal controller is coupled to the telemetry transmitter;

the trigger signal controller is configured to provide to the cellular network transmitter a command status signal comprising command status information indicating whether the actuator had been actuated;

the cellular network transmitter is configured to incorporate the command status information into the Reverse Control Channel signal.

4. The triggerable remote controller of claim 1 further comprising the trigger signal controller coupled to an apparatus controller;

the trigger signal controller configured to transmit to the apparatus controller a command status signal indicating whether the actuator had been actuated;

the apparatus controller configured to transmit to the trigger signal controller an additional command; and the trigger signal controller performing a function in response to the additional command.

5. The triggerable remote controller of claim 4 further comprising a second actuator;

the trigger signal controller attempting to actuate the second actuator in response to the additional command.

6. The triggerable remote controller of claim 4 further comprising
    a sensor;
    the trigger signal controller attempting to access the sensor in response to the additional command.

7. The triggerable remote controller of claim 1 wherein
    the enable controller is coupled to a power supply;
    the enable controller enables the GPS receiver and the cellular network transmitter by applying power to the GPS receiver and the cellular network transmitter; and
    the enable controller disables the GPS receiver and the cellular network transmitter by removing power from the GPS receiver and the cellular network transmitter.

8. A triggerable remote controller in an environment including: a source of GPS signals; a source of a trigger signal including a command, a cellular base station connected through a network to a gateway; the cellular base station being configured to expect a Reverse Control Channel signal including a Mobile Identification Number and an Electronic Serial Number, the triggerable remote controller comprising
    a GPS receiver responsive to the GPS signals for producing GPS data when enabled;
    a cellular network transmitter coupled to the GPS receiver for formatting and transmitting, when enabled, a Reverse Control Channel signal including a formatted GPS data in the place normally occupied by the Electronic Serial Number and a Mobile Identification Number that will cause the cellular base station to send a Registration Notification Invoke signal including the formatted GPS data to the gateway;
    a trigger signal receiver responsive to the trigger signal for producing an enable signal and for producing a command signal containing the command;
    a trigger signal controller coupled to the trigger signal receiver and responsive to the command signal for attempting to access a sensor depending on the command;
    an enable controller coupled to the GPS receiver, the cellular network transmitter, and the trigger signal receiver;
    the enable controller being configured to enable the GPS receiver and the cellular network transmitter upon receipt of the enable signal from the trigger signal receiver; and
    the enable controller being configured to disable the GPS receiver and the cellular network transmitter.

9. The triggerable remote controller of claim 8 wherein
    the trigger signal receiver comprises a page receiver;
    the trigger signal receiver produces the enable signal when it receives a page.

10. The triggerable remote controller of claim 8 wherein
    the trigger signal controller is coupled to the telemetry transmitter;
    the trigger signal controller is configured to read information from the sensor when it accesses the sensor;
    the trigger signal controller is configured to provide the information to the cellular network transmitter;
    the cellular network transmitter is configured to incorporate the information into the Reverse Control Channel signal.

11. The triggerable remote controller of claim 8 further comprising
    the trigger signal controller coupled to an apparatus controller;
    the trigger signal controller configured to read information from the sensor when it accesses the sensor;
    the trigger signal controller configured to transmit the information to the apparatus controller;
    the apparatus controller configured to transmit to the trigger signal controller an additional command in response to the information; and
    the trigger signal controller performing a function in response to the additional command.

12. The triggerable remote controller of claim 11 further comprising an actuator;
    the trigger signal controller attempting to actuate the actuator in response to the additional command.

13. The triggerable remote controller of claim 11 further comprising
    a second sensor;
    the trigger signal controller attempting to access the second sensor in response to the additional command.

14. A method for remotely controlling an object in an environment including: a source of GPS signals; a source of a page including a command; a cellular base station connected through a network to a gateway; the cellular base station being configured to expect a Reverse Control Channel signal including a Mobile Identification Number and an Electronic Serial Number, the method comprising
    receiving a page incorporating a command;
    enabling, in response to the page, a GPS receiver responsive to the GPS signals to produce GPS data;
    enablings, in response to the page, a cellular network transmitter to format and transmit a Reverse Control Channel signal including a formatted GPS data in the place normally occupied by the Electronic Serial Number and a Mobile Identification Number that will cause the cellular base station to send a Registration Notification Invoke signal including the formatted GPS data to the gateway;
    attempting an action in response to the command; and
    disabling the GPS receiver and the cellular network transmitter.

15. The method of claim 14 further comprising
    including in the Reverse Control Channel signal an indication of whether the function was performed.

16. The method of claim 14 wherein attempting an action comprises
    actuating an actuator.

17. The method of claim 16 further comprising
    including in the Reverse Control Channel signal an indication of whether the actuator was actuated.

18. The method of claim 14 wherein attempting an action comprises
    sensing information from a sensor.

19. The method of claim 18 further comprising
    including in the Reverse Control Channel signal the information sensed from the sensor.

\* \* \* \* \*